United States Patent
Weber et al.

(10) Patent No.: US 6,343,212 B1
(45) Date of Patent: *Jan. 29, 2002

(54) OUTPUTTING A WARNING SIGNAL WHEN APPROACHING A PROTECTED AREA WARNING OF AN IMPENDING MODE CHANGE

(75) Inventors: Matthias Weber, München; Gregor Winkler, Zorneding, both of (DE)

(73) Assignee: Sony International (Europe) GmbH, Koln-Ossendorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,359

(22) Filed: Mar. 10, 2000

Related U.S. Application Data

(63) Continuation of application No. PCT/EP99/01643, filed on Mar. 12, 1999.

(30) Foreign Application Priority Data

Apr. 16, 1999 (EP) .............................................. 99107677

(51) Int. Cl.$^7$ ................................................. H04B 1/38
(52) U.S. Cl. ....................... 455/404; 455/63; 455/76.1; 455/561; 455/421; 455/518
(58) Field of Search .................................. 455/404, 414, 455/418, 421, 426, 63, 434, 435, 436, 437, 440, 456, 31.2, 67.1, 68, 69, 70, 71, 515, 550, 561, 567, 575, 519, 518; 340/825.44

(56) References Cited

U.S. PATENT DOCUMENTS

| | | | |
|---|---|---|---|
| 5,373,548 A | * 12/1994 | McCarthy | 455/421 |
| 5,442,805 A | * 8/1995 | Sagers et al. | 455/456 |
| 5,511,233 A | * 4/1996 | Otten | 455/63 |
| 5,548,800 A | * 8/1996 | Olds et al. | 455/69 |
| 5,732,347 A | * 3/1998 | Bartle et al. | 455/421 |
| 5,966,655 A | * 10/1999 | Hardouin | 455/418 |
| 5,991,614 A | * 11/1999 | Oura | 455/404 |
| 6,085,096 A | * 7/2000 | Nakamura | 455/456 |

FOREIGN PATENT DOCUMENTS

| | | |
|---|---|---|
| EP | 0 873 033 | 10/1998 |
| WO | WO 97 49255 | 12/1997 |

* cited by examiner

*Primary Examiner*—Lester G. Kincaid
(74) *Attorney, Agent, or Firm*—Frommer Lawrence & Haug LLP; William S. Frommer

(57) ABSTRACT

A predetermined area is protected from the disturbing usage of mobile terminals (e. g. cell phones) of a wireless communication system. Mode change information is sent over a system information message of a broadcast channel to change the operating mode (e. g. to deactivate) of the mobile terminal. This mode change information contains information, such as, the duration of the mode change, a reason for the mode change and information on groups of mobile terminals that will be exempted from the mode change. Additionally, the mobile terminal transmits an alarm signal to the user if the user is approaching a predetermined protected area.

23 Claims, 3 Drawing Sheets

OUTPUTTING A WARNING SIGNAL WHEN APPROACHING A PROTECTED AREA WARNING OF AN IMPENDING MODE CHANGE

This is a continuation of copending International Application PCT/EP99/01643 having an international filing date of Mar. 12, 1999.

The present invention relates to a base station for protecting a predetermined area from disturbing usage of mobile terminals of a wireless cellular telecommunication system, to a method for protecting a predetermined area from disturbing usage of mobile terminals of a wireless cellular telecommunication system and to a mobile terminal for a wireless cellular telecommunication system.

In many areas the use of mobile terminals of wireless telecommunication systems is regarded as a nuisance for other people, like in restaurants or in the opera, or even dangerous in places like hospitals or airplanes. In the first case particularly audible signals output from mobile terminals are disturbing other people or the spectacle being given. In the second case, the use of mobile terminals, particularly the transmission of high frequency electromagnetic waves, can disturb other electronic devices or the like by interfering with their circuitry what can lead to severe incidents. It is therefore very important to provide a way to protect predetermined areas from a disturbing usage of mobile terminals within these areas. Particularly, the protection of a predetermined area should not depend on the user's will, e. g. on a user's input of information to the mobile terminal.

EP 0 891 110 A1 discloses a method and a system for preventing a mobile terminal from causing disturbance within a predetermined area, e. g. inside a plane or inside of hospitals. Particularly, the disclosed method comprises the steps of transmitting a deactivation signal from a base station to a mobile terminal and deactivating a use of the output of the mobile terminal in response to the deactivation signal. Thereby, the transmission output is deactivated. The base station can either be an ordinary base station or a base station specifically designed for mainly transmitting the deactivation signal. Although EP 0 891 110 A1 describes, that the base station could be an ordinary base station, it is not disclosed how the deactivation signals could be implemented and transmitted in an ordinary telecommunication system.

The object of the present invention is therefore to provide a base station and a method for protecting a predetermined area from disturbing usage of mobile terminals of a wireless cellular telecommunication system, which protects a predetermined area by transmitting mode change information for changing an operation mode of the mobile terminals in a simple and effective way, whereby the mode change information is transmitted on the basis of a wireless cellular telecommunication system. The object of the present invention is further to provide a mobile terminal for a wireless cellular telecommunication system, which can be controlled by such mode change information so that the predetermined area is protected from disturbing use of the mobile terminal.

The above object is achieved by a base station for protecting a predetermined area from disturbing usage of mobile terminals of a wireless cellular telecommunication system, with generating means for generating mode change information for changing an operation mode of the mobile terminals to protect the predetermined area, and transmitting means for transmitting said generated mode change information within said predetermined area by means of system information messages of a broadcast control channel of a wireless telecommunication system.

The above object is further achieved by a method for protecting a predetermined area from disturbing usage of mobile terminals of a wireless cellular telecommunication system, with the steps of generating mode change information for changing an operation mode of the mobile terminals to protect the predetermined area, and transmitting said generated mode change information within said predetermined area by means of system information messages of a broadcast control channel of a wireless telecommunication system.

Thus, the base station and the method for protecting a predetermined area from disturbing usage of mobile terminals of a wireless cellular telecommunication system enable a simple and effective way to change the operation mode of mobile terminals within the predetermined area automatically so that the predetermined area is protected.

The base station of the present invention can thereby be an ordinary base station of the wireless cellular telecommunication system which additionally to its usual elements comprises the generating means and the transmitting means according to the present invention whereby the transmitting means also transmits normal signalling or user data information of the telecommunication system. Alternatively, the base station of the present invention is a specialised base station with a restricted functionality compared to an ordinary base station. Depending on the required application, the specialised base station could comprise essentially the generating means and the transmitting means according to the present invention without further elements for communicating data in the telecommunication system. This last possibility would present a very simple and cost-effective way to protect certain areas according to the present invention.

The above object is further achieved by a mobile terminal for a wireless cellular telecommunication system, with transmitting and receiving means for transmitting information to and receiving information from base stations of said telecommunication system and for receiving mode change information transmitted from a base station by means of system information messages of a broadcast control channel of the wireless telecommunication system for protecting a predetermined area from disturbing usage of the mobile terminal, and control means for detecting received mode change information and changing an operation mode of the mobile terminal depending on the received mode change information so that said predetermined area is protected.

The wireless cellular telecommunication system can be any known or future system using system information messages in a broadcast control channel. System information messages are e. g. used, when a mobile terminal is switched on. The mobile terminal will then read the broadcast system information messages transmitted from a base station in a broadcast control channel. The system information messages usually contain information concerning the respective base station and the network, e. g. the timing, the channel structure, the location including the network identification and so on. According to the present invention, these system information messages are used for the transmission of mode change information to protect a predetermined area. The predetermined area is thereby the restricted area, in which the particular base station transmits the mode change information. E. g., such a predetermined area could be a hospital or a small area around the boarding gate of an airport or inside a plane.

The advantage of the described invention is that it does not rely on peoples responsibility to switch off their phones, but that it will perform this automatically. This will provide much higher safety to the areas to be protected.

Furthermore the mode change information is broadcast to each phone within the cell site, which makes sure that each mobile terminal supporting the mode change functionality will be reached and prevented from disturbing usage. However, it still can be possible to exempt mobile terminals from groups of people, e. g. security personnel, from mode change, so that these can still utilise the communication tools provided by mobile telephony.

A further advantage is that the described invention will only require a very small upgrade to existing systems and therefore additional investment in infrastructure is not necessary. All the described areas can be performed by changes to the software of the infrastructure. The impact on mobile terminals is also kept to a minimum in order to avoid any major impact on the cost of those terminals. According to the present invention, the system information message from the base station comprises, consists of or relates to mode change information for changing an operation mode of the mobile terminal.

Advantageously, the mode change information replace at least partially the system information messages in the broadcast control channel. Alternatively, the mode change information is additional information to the system information in the broadcast control channel. As another alternative, the system information messages of the broadcast control channel can comprise indicating information indicating a channel in which the mode change information is transmitted said channel being different from the broadcast control channel. In case that the mode change information replace the system information message, the base station according to the present invention can be built very simple and cheap, since it only needs to transmit the mode change information on a particular broadcast control channel. A mobile terminal switched on within the predetermined area receives the mode change information instead of or in addition to the system information message and changes its operation mode correspondingly. The predetermined area to be protected is usually within a cell or adjacent to one or more cells of the telecommunication system. A mobile terminal in one of the neighbouring cells may receive information, but not necessarily, about neighbouring base stations within the system information messages from the current base station. The channels, on which these neighbouring base stations can be found, are monitored by the mobile terminal and when the signal of the current base station becomes weaker and the signal from a neighbouring base station becomes stronger, the mobile terminal will eventually switch to the neighbouring cell. In case that the signal from a neighbouring base station is a mode change information according to the present invention, the mobile terminal will change its mode when the signal carrying the mode change information receives a certain strength, which indicates, that the mobile terminal is entering the predetermined area to be protected.

Advantageously, the transmitting means of the base station regularly transmits the mode change information. The generating means advantageously generates mode change information for switching off at least the high frequency portion of a mobile terminal receiving said mode change information. The high frequency portion of a mobile terminal, which comprises e. g. upconverting and downconverting means, is the most important part of a mobile terminal to be switched off for avoiding interference with the circuitry of other electronic or electric devices in the predetermined area.

Advantageously, it is possible to define additional information in the change mode information, which can exclude groups of mobile terminals from changing their mode.

Alternatively, the generating means generates mode change information for switching a mobile terminal receiving the mode change information into a silent mode, e. g. a ringer off or a vibrating device on mode. In the silent mode, audible or acoustic signals output from the mobile terminal are at least reduced to low volume to avoid a disturbance in the predetermined area. Advantageously, the audible signals are completely suppressed and replaced by visual signals, vibrating signals or other non-audible signals.

Advantageously, the mobile terminal of the present invention maintains the changed mode as long as the mode change information is received and detected. The mobile terminal could thereby regularly check if the change mode information is still received regularly and changes its mode as soon as the mode change information is not received anymore. The mobile terminal could further comprise a timing means for calculating the time period since the last reception and detection of a mode change information and for comparing the time period with a predetermined time threshold, whereby the mobile terminal is reset to the original mode in case that the time period exceeds the time threshold. Alternatively, the control means maintains the changed mode until a time period received as time information with the mode change information has expired, whereby the mobile terminal is reset to the original mode thereafter. In addition the mode change information may contain a minimum time indication on how long the mode change should apply.

Advantageously, the transmitting and receiving means of the mobile terminal receives the system information messages of the broadcast channel, whereby the system information messages comprise indicating information indicating a channel in which the mode change information is transmitted, said channel being different from the broadcast control channel, and receives said mode change information on the different channel.

Advantageously, the control means, upon detecting mode change information, switches off at least the transmitting part of a high frequency portion of the mobile terminal. The mobile terminal could still receive reset messages, which reset the change mode, through its receiver. However, the receiver still would emit high frequency signals which could disturb other equipment. In case that there is no requirement for reset messages the whole high frequency part of the mobile terminal could be switched off. Further, the entire mobile terminal could be switched off. Alternatively, the control means detecting mode change information switches the mobile terminal into a silent mode, e. g. a ringer off or a vibrating device on mode. As stated above, the silent mode is a mode in which audible or acoustic signals output from the mobile terminal are at least reduced in volume so that disturbance within the predetermined area is avoided. In case that the audible or acoustic signals are suppressed completely, they are replaced by visual signals, vibration signals or the like.

Advantageously, when the mobile terminal is located in a cell adjacent to the predetermined area, the transmitting and receiving means receives information on the position of the broadcast control channel of the base station according to the present invention for protecting the predetermined area, then, the control means of the mobile terminal determines the receiving power of the broadcast control channel of the base station. During a conversation the mobile terminal will report back these measurements, from which the system will realise that the mobile terminal is approaching the predetermined area and will then be able to issue a warning information, either through audible sounds, e. g. the earpiece or the ringer, or by signalling information to the mobile terminal, which will then behave according to pre-set behaviour. This means, that if the mobile terminal is in a normal telecommunication cell adjacent or surrounding the predetermined area, the system information message received by the mobile terminal from the current normal base station indicates the position of a broadcast control channel, on which the base station in the predetermined area for protecting the predetermined area transmits the mode change information. In case that the receiving power of the system information message in the broadcast control channel of the base station in the predetermined area is strong enough, which indicates that the mobile terminal is approaching or within the predetermined area, a alarm signal is output to warn the user that the mode of his mobile terminal will be changed soon. This is very helpful during a phone call. If a user using a mobile terminal is in a telephone conversation and approaches the predetermined area, in which the operation mode of the mobile terminal will be changed, he receives a warn signal and is thus able to either terminate the conversation or step further away from the predetermined area to be able to continue his conversation.

In the following description, the present invention is explained in more detail by means of preferred embodiments thereof relating to the enclosed drawings, in which FIG. 1 shows a block diagram of a base station according to the present invention and;

Figure 1:
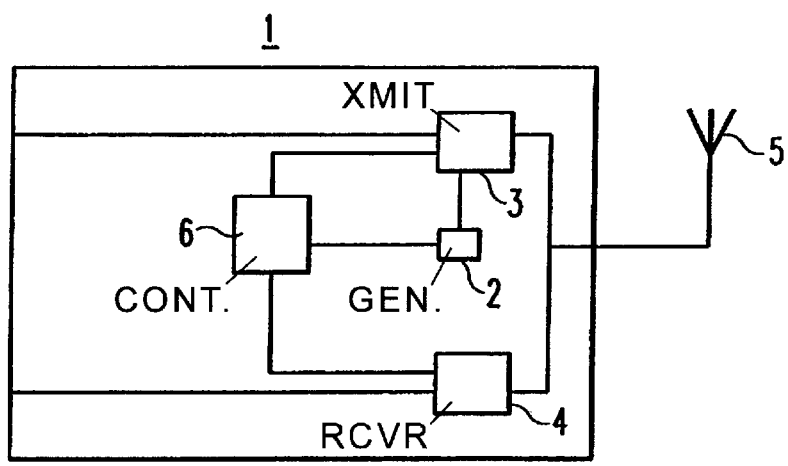

The base station 1 shown in FIG. 1 is a base station for protecting a predetermined area from disturbing usage of mobile terminals of a wireless cellular telecommunication system. The base station 1 comprises generating means 2 for generating mode change information for changing an operation mode of the mobile terminals within the predetermined area to protect the predetermined area. The base station 1 further comprises transmitting means 3 for transmitting mode change information generated in the generating means 2 within the predetermined area using system information messages of a broadcast control channel of the wireless telecommunication system. The mode change information is transmitted from the transmitting means 3 by means of an antenna 5.

Figure 2:
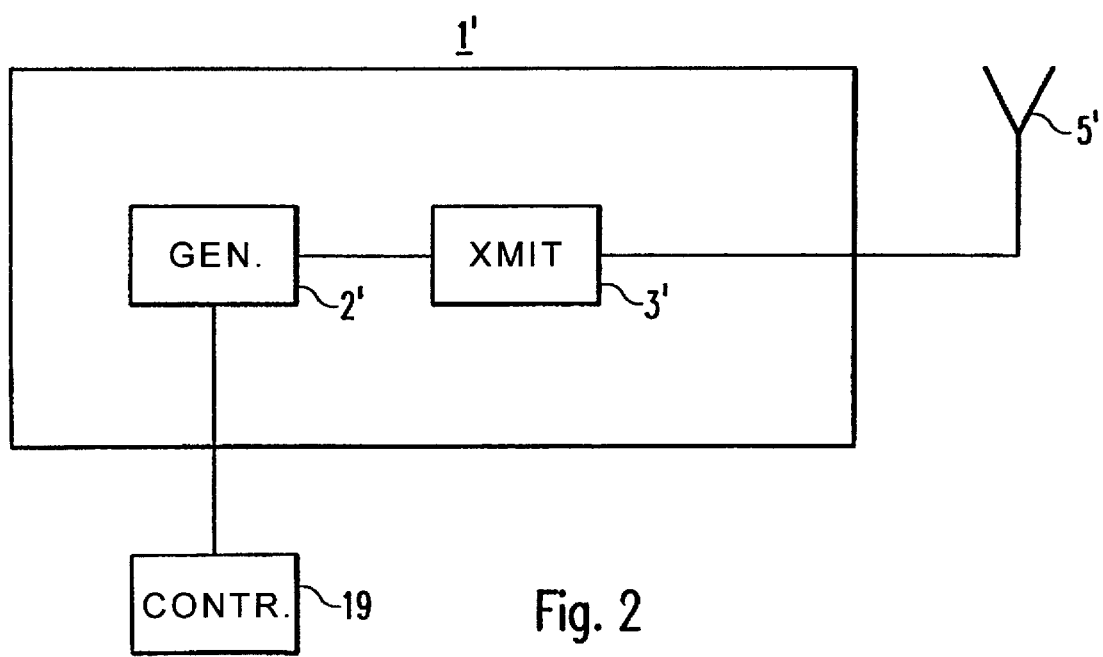
FIG. 2 shows a block diagram of a reduced base station according to the present invention.

The base station 1 can be a normal base station for transmitting and receiving signals in the wireless cellular telecommunication system or a special base station as outlined in FIG. 2 only transmitting said mode change information for protecting the predetermined area. In the first case, the base station 1 further comprises receiving means 4 as shown in FIG. 1. In the second case, the base station 1 essentially comprises only the generating means 2 and the transmitting means 3, so that a very simple and cost-effective solution is achieved. In the second case, the base station 1' as shown in FIG. 2 comprises only a transmitting means 3' and a generating means 2' and serves only for transmitting the mode change information within the predetermined area without having further capabilities. The transmitting means 3' and the generating means 2' have the same functions as the transmitting means 3 and the generating means 2, respectively. For ease of operation an external or internal control terminal or PC 19 could be connected.

Of course, the base station 1 in FIG. 1 comprises further elements which are necessary to operate the base station 1 in the respective telecommunication system, e. g. a control means 6 and so on. The base station 1 operates and transmits the mode change information on the basis of the wireless cellular telecommunication system, i. e. the GSM-system or the like. This has the advantage that mobile terminals entering the predetermined area can be addressed on the basis of the wireless cellular telecommunication system to change an operation mode thereof to protect a predetermined area without requiring a different receiving section for the mode change information transmitted from the base station 1. This has the additional advantage that the mobile terminals, as e. g. the mobile terminal 7 shown in FIG. 3, can be common mobile terminals for the wireless telecommunication system, which only need to be adapted to receive and process the mode change information. Thus, the configuration of normal mobile terminals for the wireless telecommunication system does not need to be changed essentially.

Figure 3:
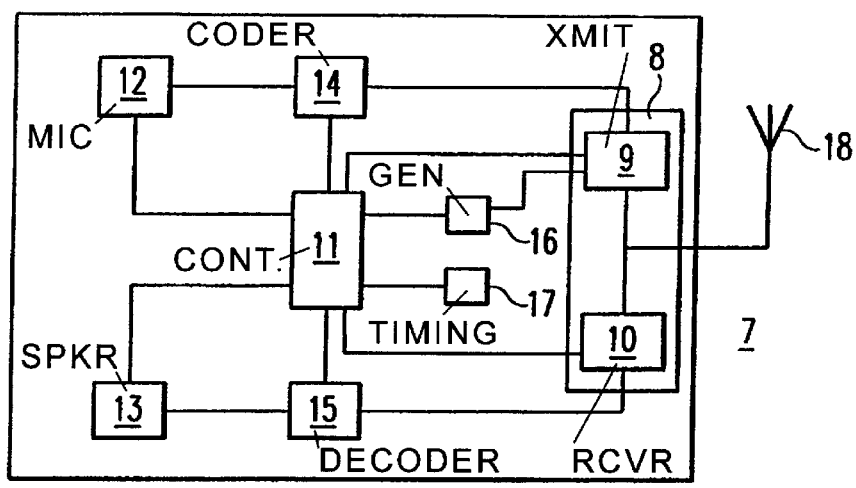
FIG. 3 shows a block diagram of a mobile terminal according to the present invention.

In FIG. 3, a block diagram of a mobile terminal 7 according to the present invention is shown. The mobile terminal 7 comprises transmitting and receiving means 8 for transmitting information to and receiving information from base stations of the telecommunication system. The transmitting and receiving means 8 further receive mode change information transmitted from a base station by means of system information messages of a broadcast control channel of the wireless telecommunication system for protecting a predetermined area from disturbing usage of the mobile terminal. E. g., the base station transmitting the mode change information can be the base station 1 of FIG. 1 or the reduced base station 1' of FIG. 2. The transmitting and receiving means 8 comprises a transmitting unit 9 and a receiving unit 10. The receiving unit 10 of the transmitting and receiving means 8 receives signals by means of an antenna 18. The received signals are then processed in the mobile terminal 7 under control of a control means 11. E. g., the received signals are decoded in a decoding means 15, whereby further processing steps depending on the structure of the signals might be taken. At the end of the processing, the signals are transformed into audible signals and output from a loudspeaker 13 in case they are voice signals, or answered by the mobile terminal in case they are signalling information, or passed on to the data part or a data device in case they are data signals.

The mobile terminal 7 further comprises a microphone 12 for receiving and detecting acoustic signals. The signals input in the microphone 12 are further processed under the control of the control means 11, e. g. coded in a coding means 14 and so on depending on the structure of the signals in the telecommunication system, and then transmitted by the transmitting unit 9 through the antenna 18. The mobile terminal 7 comprises further elements for processing received signals and signals to be transmitted besides the decoding means 15 and the coding means 14 as shown in FIG. 3. The additional elements depend on the structure of the signals in the wireless telecommunication system, so that a large variety of further processing units can be implemented.

The mobile terminal 7 further comprises a generating means 16 connected between the control means 11 and the transmitting unit 9 and a timing means 17 connected with the control means 11.

Figure 4:
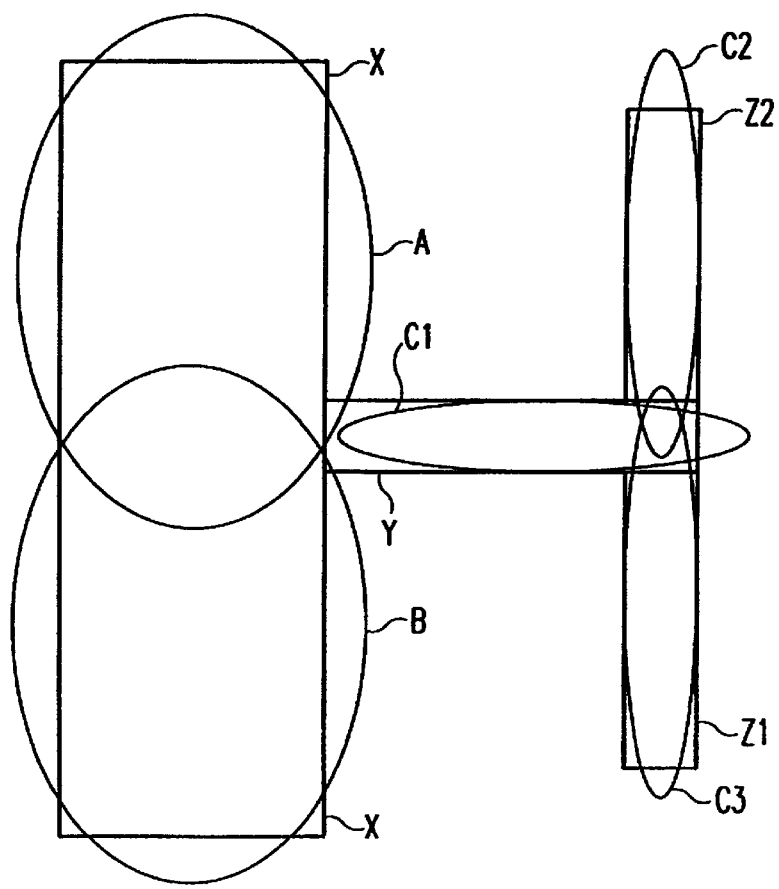
FIG. 4 shows a principle outline of standard cellsites adjacent to areas to be protected according to the present invention.

FIG. 4 shows the topography of e. g. an airport terminal, where areas A and B are the coverage areas of a cell site, covering the waiting lounge X. Areas C1, C2 and C3 indicate the coverage area of cell sites covering predetermined areas, e. g. the gangways towards an airplane, Y, Z1 and Z2. As long as a user is making phone calls or is walking in areas "A" and "B" his phone will work normally and nothing will happen. Once he is approaching the area "C1" the network may issue warning indications to the phone while it is in communication, warning the user that he is coming closer to a predetermined area. Once the user enters the area "C1", "C2" or "C3" the telephone will receive the mode change information and change its mode accordingly. This functionality not necessarily requires separate cell sites, this could also be handled in area "C1" alone.

The base station 1 being located in an area which has to be protected from a disturbing usage of mobile terminals regularly broadcasts mode change information which is received by mobile terminals, as e. g. a mobile terminal 7, entering the predetermined area to change an operation mode thereof so that the area is protected. Thereby, the mode change information is broadcasted from the base station 1 on the basis of system information messages in a broadcast control channel of the wireless telecommunication system.

Figure 5:
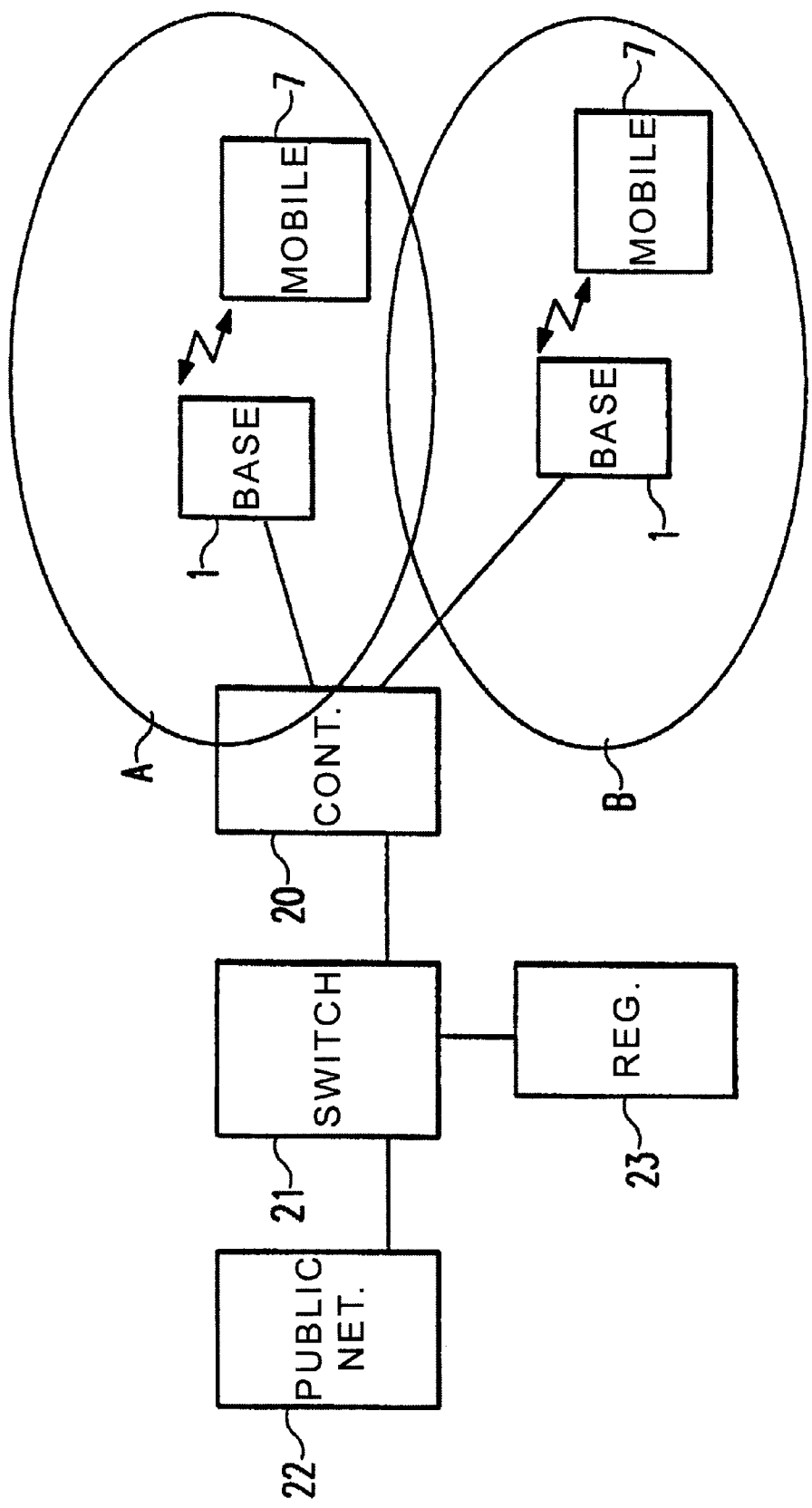
FIG. 5 shows the principle system architecture of a cellular network according to the present invention.

FIG. 5 shows the basic structure of a cellular system, which comprises at least two base stations 1, covering the areas A and B, a base station controller 20, a switch 21 with a gateway to a public telephone network 22, a register 23 which keeps information on the terminals of this cellular network and possibly of visiting mobile terminals and the mobile terminals 7 themselves. The base stations are connected with the base station controller via a communication and signalling link, the base station controller and the switch is connected via a communication and signalling link, the register and the switch are connected by a communication and signalling link, as well as the switch and the public telephone network. The mobile terminals 7 and the base stations 1 communicate by means of radio transmission.

Usually, when a mobile terminal is switched on the first time, it reads the system information from the broadcast control channel. Once it has the knowledge about timing, channel structure, location including the network identification of the particular base station of the respective cell of the telecommunication system, the mobile terminal will try to register itself with the network through this base station. This means, that the mobile terminal makes itself known to the network, so that the network will be able to page the mobile terminal later on. After a successful registration a mobile terminal will listen regularly to the paging channel of the respective base station in order to be able to react on incoming phone calls. Furtheron, the mobile terminal monitors base stations in neighbouring cells, the channels of which are listed in the system information of the current cell. A paging area can comprise several cells, in which a particular mobile terminal is paged. When a mobile terminal is moving around in the network, the signal of the base station of the current cell will become weaker and a signal from a neighbouring cell will become stronger. Eventually, the mobile terminal switches to the base station of the neighbouring cell. This is true, when the mobile terminal is in the idle mode, when the mobile terminal is in the talk mode, a cell change, i. e. a hand-over, is initiated by the network. In other cellular systems, e. g. CDMA One, the mobile station itself would decide on its own whether to perform a handover or not. Once the mobile terminal has switched to the base station of the neighbouring cell, it will again read all necessary information from the system information message broadcast on the broadcast control channel from the base station of the new cell. If this new cell belongs to the same paging area as the previous cell, the mobile terminal will not perform a registration (location update). In case that the base terminal belongs to a new paging area, the mobile terminal will perform a registration (location update).

Thus, two scenarios are possible. The first scenario is that the mobile terminal 7 located within a predetermined area to be protected is switched on being within the predetermined area. The mobile terminal will then read the system information message in the broadcast control channel transmitted from the respective base station, e. g. the base station 1 for protecting the predetermined area. Since the base station 1 transmits mode change information by means of the system information message, the mobile terminal 7 receives the mode change information either within or as a part of the system information message or through another channel indicated by the system information message and then changes its mode so that the area is protected.

The mode change information generated in the generating means 2 of the base station 1 can be additional information to the system information messages or can replace at least partially the system information messages in the broadcast control channel. The mode change information are thus comprised in the system information message, which is received by the base terminal 7 so that an operation mode thereof is changed to protect the predetermined area.

Another possibility is that the system information messages generated and transmitted from the base station 1 comprise indicating information indicating a channel in which the mode change information is transmitted, whereby this channel is different from the broadcast control channel. In other words, the system information message transmitted by the base station 1 in the broadcast control channel refer to another channel, in which the mode change information is transmitted. The mobile terminal 7 receiving the system information message will receive the indicating information and look on the other indicated channel, in which the mode change information is transmitted. Thus, the mobile terminal 7 reads the mode change information by means of the received system information message. As stated above, a simple and cost-effective version of the base station 1 essentially comprises the generating means 2 and the transmitting means 3 so that only mode change information is generated and transmitted by the base station 1. In this case, the system information messages contain the mode change information and the standard or default system information messages in the broadcast control channel. The mobile terminal 7 will then receive the mode change information and change its mode correspondingly, without attempting a registration, e. g. location update. The mode change information can also contain the reason for the mode change. In a more developed version of the base station 1 the mode change information replace only a part of the system information message in the broadcast control channel, so that further information like the reason for the mode change, the level of the mode change or the like can be transmitted to the mobile terminal 7. Particularly, the mobile terminal 7 does not need to register with the base station 1 for protecting the predetermined area. It is sufficient, when the mobile terminal 7 receives the mode change information from the base station 1 to change its mode to protect the area. The base station of the predetermined area to be protected is thereby treated as a normal neighbouring base station of an adjacent cell. In case that the mobile terminal 7 is registered to a normal base station in a cell of the telecommunication system, this normal base station comprises in its system information messages information about the channels of the neighbouring base stations. If one of the neighbouring base stations is the base station 1 for protecting the predetermined area, the mobile terminal 7 will regularly monitor the signal power of the base station 1 as it does with the other adjacent base stations. The mobile terminal 7 can thereby monitor the broadcast control channel of the base station 1 for protecting the predetermined area so that as soon as the receiving power exceeds a predetermined threshold the control means 11 of the mobile terminal 7 decides to change a mode thereof since the predetermined area is reached.

In any case, the control means 11 of the mobile terminal 7 can cause the loudspeaker 13 to output an alarm signal to warn a user that he is approaching or within the predetermined area to be protected and that the operation mode of the mobile terminal 7 will be changed soon to protect the area. Thus, the user can decide to get away from the predetermined area or, in case that a call is in progress, he can terminate the conversation quickly.

Upon receiving a mode change information by the transmitting and receiving means 8, the control means 11 of the mobile terminal 7 detects the mode change information and changes the mode of the mobile terminal 7 depending on the received mode change information so that the predetermined area is protected. The control means 11 can thereby maintain the changed mode as long as mode change information is regularly received and detected. As soon as mode change information is no longer received, the mobile terminal 7 is reset to its original mode before the mode change. The timing means 17 of the mobile terminal 7 may calculate the time period since the last reception and detection of the mode change information and for comparing the time period with a predetermined time threshold, whereby the mobile terminal 7 is reset to the original mode in case that the time period exceeds the time threshold. If a time indication is present in the mode change information, the MS must not attempt a reset before the indicated time.

Alternatively, the control means 11 maintains the changed mode until the time period received as time information together with the mode change information has expired, whereby the mobile terminal 7 is reset to the original mode thereafter. In this case, the generating means 2 of the base station 1 needs to generate additional time information to the mode change information to indicate how long the changed mode in the mobile terminal 7 should be maintained. Another possibility is to store the time information in the mobile terminal 7 so that the time period during which the changed mode has to be maintained is provided by the mobile terminal 7 itself.

If e. g. the predetermined area to be protected is a hospital, where it has to be assured that mobile terminals are not used, the mobile terminals advantageously maintain their changed mode as long as the mode change information is received. In this case, one or more base stations 1 are located in the hospital and regularly broadcast the mode change information. In other areas, e. g. hospitals, it might be only important to change the mode of mobile terminals during a short period of time. Thus, a base station 1 could be located at the entrance, so that the operation mode of mobile terminals entering the hospital are changed. The changed mode only needs to be maintained during the visit. Thus, a predetermined time period, e. g. 30 minutes, 60 minutes or the like, is sufficient and the mobile terminals could be reset to their original modes after expiration of this predetermined time period. A further possibility might be to change the mode of mobile terminals upon receiving a mode change information, e. g. at a boarding gate of an airport, to maintain the changed mode during the flight and to reset the mode of the mobile terminals upon receiving a second mode change information at the exit gate of the airport on the arrival.

Depending on the received mode change information, the control means 11 of the mobile terminal 7 changes the operation mode thereof. If areas like a hospital or airplanes are to be protected, the control means 11 switches off at least a high frequency portion of the mobile terminal 7. The high frequency portion of the mobile terminal is the part causing interference with other electronic or electric devices and thus the operation of the high frequency part should be suppressed. In case of the mobile terminal 7 shown in FIG. 3, the control means 11 could switch off at least the transmitting unit 9 of the transmitting and receiving means 8 upon receiving a mode change information. The mobile terminal 7 is then still able to receive signals by means of the receiving unit 10, e. g. to receive information to reset the mobile terminal 7 to its original mode. Alternatively, the control means 11 could switch off the entire transmitting and receiving means 8 so that neither the transmission nor the reception of signals is possible any longer. In both cases, however, the base band functions could still be available, so that a user still can edit information, input information to the internal telephone book, store messages to be transmitted later on and the like.

In other areas, e. g. restaurants, operas, theatres or the like, it is sufficient to change the mode of the mobile terminal 7 into a silent mode, in which other people in the same area are not annoyed by audible or acoustic signals output from the mobile terminal 7. Thereby it might be sufficient if the control means 11 simply reduces the volume of the acoustic signals to be output by the loudspeaker 13. Further, the volume of signals to be output by the loudspeaker 13 could be completely suppressed. Additionally to the reduced volume signals or replacing the suppressed audible signals, the control means 11 might cause the output of the visual signals on a display of the mobile terminal 7, the activating of a vibration device of the mobile terminal 7 or the like to indicate incoming phone calls to a user.

What is claimed is:

1. A base station for protecting a predetermined area from disturbing usage of mobile terminals of a wireless communications system, comprising:

a generator for generating mode change information for changing an operation mode of said mobile terminals to prevent said mobile terminals from operating in a disturbing mode, and for generating identifying information representing at least one group of mobile terminals that receive said mode change information but are excluded from changing their operation mode; and
   a transmitter coupled to said generator for transmitting said generated mode change information and said identifying information within said predetermined area by means of system information messages on a broadcast control channel of said wireless communication system.

2. The base station of claim 1, wherein said mode change information replaces at least a portion of said system information messages on said broadcast control channel.

3. The base station of claim 1, wherein said mode change information is transmitted in addition to said system information messages on said broadcast control channel.

4. The base station of claim 1, wherein said system information messages include an identification channel on which mode change information is transmitted, said last-mentioned channel being different than said broadcast control channel.

5. The base station of claim 1, wherein said transmitter regularly transmits said mode change information.

6. The base station of claim 1, wherein said mode change information is operable to deactivate at least a high frequency portion of the mobile terminal that receives said mode change information.

7. The base station of claim 1, wherein said mode change information is operable to turn off audible signal generators of the mobile terminal that receives said mode change information.

8. The base station of claim 1, wherein said mode change information includes timing information to establish a time duration during which the operating mode of the mobile terminal that receives said mode change information remains changed.

9. The base station of claim 1, wherein said mode change information includes information representing the reason for the change in the operating mode of the mobile terminal that receives said mode change information.

10. Method for protecting a predetermined area from disturbing usage of mobile terminals of a wireless cellular communication system, comprising the steps of:

generating mode change information for changing an operation mode of said mobile terminals to prevent said mobile terminals from operating in a disturbing mode, and for generating identifying information representing at least one group of mobile terminals that receive said mode change information but are excluded from changing their operation mode; and transmitting said generated mode change information and said identifying information within said predetermined area by means of system information messages on a broadcast control channel of said wireless communication system.

11. The method according to claim 10, wherein said mode change information replaces at least a portion of said system information messages on said broadcast control channel.

12. The method according to claim 10, wherein said mode change information is transmitted in addition to said system information messages on said broadcast control channel.

13. The method according to claim 10, wherein said system information messages include an identification channel on which mode change information is transmitted, said last-mentioned channel being different than said broadcast control channel.

14. The method according to claim 10, wherein said mode change information is regularly transmitted.

15. The method according to claim 10, wherein said mode change information is operable to deactivate at least a high frequency portion of a mobile terminal that receives said mode change information.

16. The method according to claim 10, wherein said mode change information is operable to turn off audible signal generators of the mobile terminal that receives.

17. A mobile terminal for a wireless cellular telecommunication system, comprising:

transmitting and receiving means for transmitting information to and receiving information from base stations of said telecommunication system and for receiving mode change information transmitted from a base station by means of system information messages on a broadcast control channel of said wireless telecommunication system for protecting a predetermined area from disturbing usage of the mobile terminal; and control means for detecting received mode change information and a mode of the mobile terminal depending on the received change information so that said predetermined area is protected, wherein in a case of being located in a cell adjacent to said predetermined area said transmitting and receiving means receives information on the position of said broadcast control channel of the base station for protecting said predetermined area, said control means determines the receiving power of said broadcast control channel of the base station and outputs an alarm signal to a user either through audible sounds or signaling means that a mode of the mobile terminal will soon be changed.

18. The mobile terminal according to claim 17, wherein said control means maintains said changed mode as long as the mode change information is received and detected.

19. The mobile terminal according to claim 17, including a timing means for calculating the time period since the last reception and detection of said mode change information and for comparing said time period with a predetermined time threshold, whereby the mobile terminal is reset to an original mode in the event that the time period exceeds said time threshold.

20. The mobile terminal according to claim 17, wherein said control means maintains said changed mode until a time period represented as time information included with said mode change information has expired, whereby the mobile terminal is reset to an original mode thereafter.

21. The mobile terminal according to claim 17, including switching means which switches said broadcast control channel normally received by said mobile terminal to a mode change information channel.

22. The mobile terminal according to claim 17, wherein said control means detecting said mode change information deactivates at least a high frequency portion of the mobile terminal.

23. The mobile terminal according to claim 17, wherein said control means detecting said mode change information turns off audible signal generators of the mobile terminal.

* * * * *